US009710523B2

(12) United States Patent
Skurtovich, Jr. et al.

(10) Patent No.: US 9,710,523 B2
(45) Date of Patent: *Jul. 18, 2017

(54) SYSTEM, METHOD AND SOFTWARE FOR PROVIDING PERSISTENT ENTITY IDENTIFICATION AND LINKING ENTITY INFORMATION IN A DATA REPOSITORY

(71) Applicant: Experian Marketing Solutions, Inc., Schaumburg, IL (US)

(72) Inventors: John L. Skurtovich, Jr., Anaheim, CA (US); Pamela Barrios, Villa Park, CA (US); Timothy Sumida, Yorba Linda, CA (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,946

(22) Filed: Feb. 4, 2016

(65) Prior Publication Data
US 2016/0154859 A1 Jun. 2, 2016

Related U.S. Application Data

(63) Continuation of application No. 14/160,973, filed on Jan. 22, 2014, now Pat. No. 9,256,624, which is a
(Continued)

(51) Int. Cl.
*G06F 17/30* (2006.01)
*G06Q 40/02* (2012.01)

(52) U.S. Cl.
CPC .. *G06F 17/30539* (2013.01); *G06F 17/30292* (2013.01); *G06F 17/30386* (2013.01);
(Continued)

(58) Field of Classification Search
USPC .............. 707/791, 793, 795–796, 800, 803
See application file for complete search history.

(56) References Cited

U.S. PATENT DOCUMENTS

| | | | |
|---|---|---|---|
| 5,878,262 A * | 3/1999 | Shoumura | G06F 8/20 705/7.12 |
| 6,606,630 B1 * | 8/2003 | Gunlock | G06F 3/0601 370/216 |

(Continued)

*Primary Examiner* — Hanh Thai
(74) *Attorney, Agent, or Firm* — Knobbe, Martens, Olson & Bear, LLP (57) ABSTRACT

The present invention provides a system, method and software for linking persistent and unique business identifiers, associated with business entities, for associating corresponding business records without a loss of historical records, regardless of subsequent changes, updates, and mergers. In the various embodiments, a first business record, of the plurality of business records, is associated with a first business identifier; and a second business record, which does not match the first record, is associated with a second business identifier. Subsequently, when the first business identifier and the second business identifier are determined to correspond to a singular business entity, the first business identifier and the second business identifier are linked, and respective associations of the first business record and the second business record with the linked first business identifier and second business identifier are maintained, with corresponding source references, and collectively utilized in subsequent search and match determinations.

27 Claims, 3 Drawing Sheets

Related U.S. Application Data continuation of application No. 13/180,028, filed on Jul. 11, 2011, now Pat. No. 8,671,115, which is a continuation of application No. 12/620,323, filed on Nov. 17, 2009, now Pat. No. 8,001,153, which is a continuation of application No. 10/651,469, filed on Aug. 29, 2003, now Pat. No. 7,647,344.

(60) Provisional application No. 60/474,350, filed on May 29, 2003.

(52) U.S. Cl.
CPC .. *G06F 17/30483* (2013.01); *G06F 17/30528* (2013.01); *G06F 17/30545* (2013.01); *G06F 17/30867* (2013.01); *G06Q 40/02* (2013.01); *Y10S 707/99948* (2013.01)

(56) References Cited

U.S. PATENT DOCUMENTS

| | | | |
|---|---|---|---|
| 7,003,504 B1* | 2/2006 | Angus | G06F 17/30563 |
| 7,185,016 B1* | 2/2007 | Rasmussen | G06Q 10/10 |
| 7,403,942 B1* | 7/2008 | Bayliss | G06F 17/30303 |
| | | | 707/748 |
| 2002/0103809 A1* | 8/2002 | Starzl | G06F 17/30864 |
| 2003/0131024 A1* | 7/2003 | de la Huerga | G06F 17/22 |
| 2003/0135512 A1* | 7/2003 | Morgan, Jr. | G06F 17/30882 |
| 2003/0172006 A1* | 9/2003 | Fino | G06Q 30/02 |
| | | | 715/200 |
| 2004/0139070 A1* | 7/2004 | Dysart | G06F 17/30607 |

* cited by examiner

SYSTEM, METHOD AND SOFTWARE FOR PROVIDING PERSISTENT ENTITY IDENTIFICATION AND LINKING ENTITY INFORMATION IN A DATA REPOSITORY

FIELD OF THE INVENTION

The present invention relates, in general, to database management systems and, more particularly, to a system, method and software for providing consistent and persistent business entity identification and linking business entity information in an integrated data repository.

CROSS-REFERENCE TO RELATED APPLICATIONS

This application is a continuation of and claims priority to John L. Skurtovich, Jr. et al., U.S. patent application Ser. No. 14/160,973, filed Jan. 22, 2014 and issuing Feb. 9, 2016 as U.S. Pat. No. 9,256,624, titled "System, Method And Software For Providing Persistent Entity Identification And Linking Entity Information In An Integrated Data Repository", which is a continuation of and claims priority to John L. Skurtovich, Jr. et al., U.S. patent application Ser. No. 13/180,028 filed Jul. 11, 2011 and issued Mar. 11, 2014 as U.S. Pat. No. 8,671,115, titled "System, Method And Software For Providing Persistent Entity Identification And Linking Entity Information In An Integrated Data Repository", which is a continuation of and claims priority to John L. Skurtovich, Jr. et al., U.S. patent application Ser. No. 12/620,323 filed Nov. 17, 2009 and issued Aug. 16, 2011 as U.S. Pat. No. 8,001,153, titled "System, Method And Software For Providing Persistent Personal and Business Entity Identification And Linking Personal and Business Entity Information In An Integrated Data Repository", which is a continuation of and claims priority to John L. Skurtovich, Jr. et al., U.S. patent application Ser. No. 10/651,469 filed Aug. 29, 2003 and issued Jan. 12, 2010 as U.S. Pat. No. 7,647,344, titled "System, Method And Software For Providing Persistent Entity Identification And Linking Entity Information In An Integrated Data Repository", which further claims the benefit of and priority to U.S. Provisional Application No. 60/474,350, filed May 29, 2003, by John L. Skurtovich, Jr. et al., entitled "Advanced Data Management Process to Create Customized View of Client's Consumer Data and Applications", which are commonly assigned herewith, and each of which is incorporated by reference herein with the same full force and effect as if set forth in their entireties herein, with priority claimed for all commonly disclosed subject matter.

BACKGROUND OF THE INVENTION

Business and consumer records are typically contained in databases and other forms of data repositories. Typical databases may contain records such as credit histories, driving records, demographic data, customer data, marketing data, name and address information, bank account information, medical data, court records, securities transactions, and so on. Virtually any type of information may be contained in any such database.

The information contained in such data repositories, however, is generally not static, but is continually changing. For example, account balances may vary from day to day. Individuals change their names, or move to a new city. Businesses expand and add locations, are acquired or divested, or, unfortunately, may go out of business. As a consequence, it is not only important to continually update the appropriate databases with current information, it is also important to track the sources of the updated information, and the likelihood that such changes have, in fact, occurred.

In the prior art, however, when such records are updated, the previous information may be lost. Typically in database management systems, when an update occurs, an older record is merged into the newer record and then may be deleted or purged. The updated information may be inaccurate or erroneous, however, with the accurate data now lost due to the record merger process. In addition, any historical data associated with the merged record may also be lost, including a loss of corresponding source information and other information which pertains to the credibility of the data. In other prior art system, the historical data may be archived and unavailable for use in current data processing tasks.

As a consequence, a need remains for a method, system and software which provides the capability for appropriate mergers of business records, but which also preserves all associated historical data, including source information and merge history, and provides for such historical data to be available in real time for use in current processing tasks, such as searching and matching processes.

SUMMARY OF THE INVENTION

The present invention provides a system, method and software for linking unique business identifiers, associated with business entities, for associating corresponding business records over time without a loss of historical records, regardless of subsequent changes, updates, and mergers. In the various embodiments, a first business record, of the plurality of business records, is associated with a first business identifier of a plurality of business identifiers, with each business identifier of the plurality of business identifiers being unique. A second business record, of the plurality of business records, is associated with a second business identifier of the plurality of business identifiers. Subsequently, when the first business identifier and the second business identifier are determined to correspond to a singular business entity of the plurality of business entities, the first business identifier and the second business identifier are linked. In addition, the respective associations of the first business record and the second business record with the linked first business identifier and second business identifier are maintained throughout this linking, generally for a predetermined period of time.

In the various embodiments, the first business identifier and the second business identifier are determined to correspond to the singular business entity when a determination is made that a third business record, of the plurality of business records, matches with a first element of a first plurality of elements of the first business record and further matches with a second element of a second plurality of elements of the second business record. In selected embodiments, the first plurality of elements and the second plurality of elements each comprise at least two similar variations of the following common elements: a business name element, a business address element, a tax identification element, a telephone number element, a standard industry code element, and a client key element. In the various matching processes, the matches may be exact, or may be flexible (less exact) with corresponding confidence levels, rankings or weightings.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF THE INVENTION

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

As indicated above, the present invention provides a system, method and software for linking unique business identifiers, associated with business entities, for associating corresponding business records without a loss of historical records, regardless of subsequent changes, updates, and mergers. The business identifiers (or identifications) ("BIDs"), in accordance with the present invention, are persistent and invariant, namely, once assigned to a selected business entity, the BID will continue to exist and identify that selected business entity, at a granular (i.e., atomic or data record) level. When BIDs are linked, as discussed below, all BIDs continue to exist, rather than eliminating one or more identifiers when data records are merged. The BIDs are also consistent over time, and all associated records are then utilized together as a group for other processing tasks.

Business records associated with different business identifiers may subsequently be matched, indicating that the different business identifiers are actually associated with the same business entity and, in accordance with the present invention, the corresponding BIDs will be "linked". Following a linking of BIDs, each BID of the linking will continue to exist, as will all corresponding historical records. Throughout these linkings, all information associated with each separate BID is maintained over time, is not archived, but is available and accessible in real time for use in current processing tasks, such as searching and matching.

The maintenance of records and other information at a "granular" or atomic level, without consolidation or merger, and the persistent association of those records with a BID, are significant. First, it improves the search and matching methodology of the invention, allowing searches to include data variations, such as name and address variations, which might otherwise be lost in a merger of data records. Second, the history and sources for all of this information are also tracked and maintained, providing significant verification capability, and providing additional differentiation capability and confidence levels in the matching process. Third, the atomic level data is maintained in a non-archival and active way, such that it is always available for making any and all future match, update of linking decisions.

Figure 1:
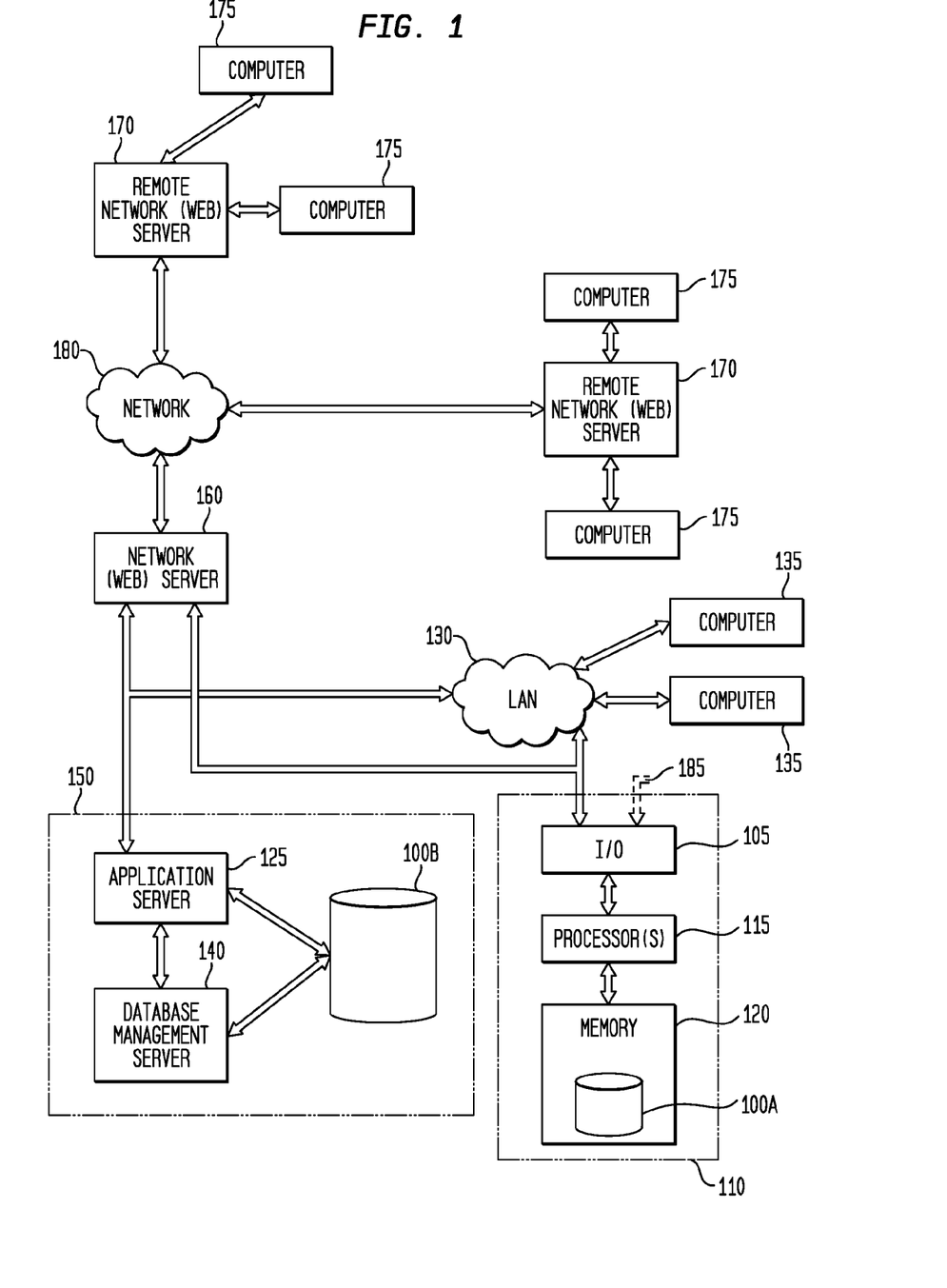
FIG. 1 is a block diagram illustrating first and second exemplary system embodiments in accordance with the present invention.

FIG. 1 is a block diagram illustrating first exemplary system embodiment 110 and second exemplary system embodiment 150 in accordance with the present invention. As illustrated in FIG. 1, the first exemplary system embodiment 110 is a mainframe computer embodiment, comprising an input and output (I/O) interface 105, one or more processors 115, and a memory 120 storing a database (or data repository) 110A. The second system 150 comprises an integrated data repository (or database) 100B (also embodied in a form of memory, discussed below), a database management server 140, and/or an application server 125. A "data repository", "database", and "data warehouse", as used herein, are considered interchangeable, and may be relational, object-oriented, or object-relational. Both database 110A and 110B are instantiations of a database 100, discussed in greater detail below.

In selected embodiments of system 150, the database management server 140 and the application server 125 may be implemented together, such as implemented within the application server 125. Either or both of the database management server 140 and the application server 125 are coupled (or couplable) to the integrated data repository (database) 100B, for full duplex communication, such as for database queries, database file or record transfers, database updates, and other forms of database communication. In the second system embodiment 150, the database management server 140 and/or the application server 125 perform the methodology of the invention utilizing a correspondingly programmed or configured processor as discussed below (not separately illustrated), such as a processor 115, in conjunction with a database 100 (such as database 100B).

Typically, the databases 100A and 100B are ODBC-compliant (Open Database Connectivity), although this is not required for the present invention. The first system 110 and second system 150 may also be coupled to or may be part of a local area network ("LAN") 130 or, not separately illustrated, a wide area network ("WAN"), such as for full duplex communication with a plurality of computers (or other terminals) 135, also for database queries, database file or record transfers, database updates, and other forms of database communication. The LAN 130 communication capability provides for the first system 110 and second system 150 to be accessible for local access to the databases 100A and 100B, such as for large file transfers or other batch processing, discussed in greater detail below. In addition, the first system 110 may also be directly accessible (185), such as for loading of records (e.g., magnetic tape records or other media) for batch processing.

The first system 110 and second system 150 may also be included within or coupled to a larger data communication network 180, through network (or web) server 160, for full duplex communication with remote devices, such as a remote Internet or other network server 170 and remote computer (or other terminal) 175. Such remote communication capability provides for the first system 110 and second system 150 to be accessible for on-line functionality, discussed in greater detail below, such as for web-based access, using any of the prior art protocols, such as hypertext transfer protocol (HTTP) or other Internet Protocol ("IP") forms of communication for data, voice or multimedia.

The integrated data repository (or database) 100, illustrated as databases 110A and 110B, may be embodied in any number of forms, including within any data storage medium, memory device or other storage device, such as a magnetic hard drive, an optical drive, other machine-readable storage or memory media such as a floppy disk, a CDROM, a CD-RW, a memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2PROM$, or any other type of memory, storage medium, or data storage apparatus or circuit, which is known or which becomes known, depending upon the selected embodiment.

In the first system 110, the I/O interface may be implemented as known or may become known in the art. The first system 110 and second system 150 further include one or more processors, such as processor 115 illustrated for first system 110. As the term processor is used herein, these implementations may include use of a single integrated circuit ("IC"), or may include use of a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or $E^2PROM$. A processor (such as processor 115), with its associated memory, may be configured (via programming, FPGA interconnection, or hard-wiring) to perform the methodology of the invention, as discussed above and as further discussed below. For example, the methodology may be programmed and stored, in a processor with its associated memory (and/or memory 120) and other equivalent components, as a set of program instructions (or equivalent configuration or other program) for subsequent execution when the processor is operative (i.e., powered on and functioning). Equivalently, when the first system 110 and second system 150 may implemented in whole or part as FPGAs, custom ICs and/or ASICs, the FPGAs, custom ICs or ASICs also may be designed, configured and/or hard-wired to implement the methodology of the invention. For example, the first system 110 and second system 150 may implemented as an arrangement of microprocessors, DSPs and/or ASICs, collectively referred to as a "processor", which are respectively programmed, designed or configured to implement the methodology of the invention, in conjunction with a database 100.

The application server 125 and database management server 140 may be implemented using any form of server, computer or other computational device as known or may become known in the art, such as a server or other computing device having a processor, microprocessor, controller, digital signal processor ("DSP"), adaptive computing circuit, or other integrated circuit programmed or configured to perform the methodology of the present invention, such as a processor 115, as discussed in greater detail below.

Figure 2:
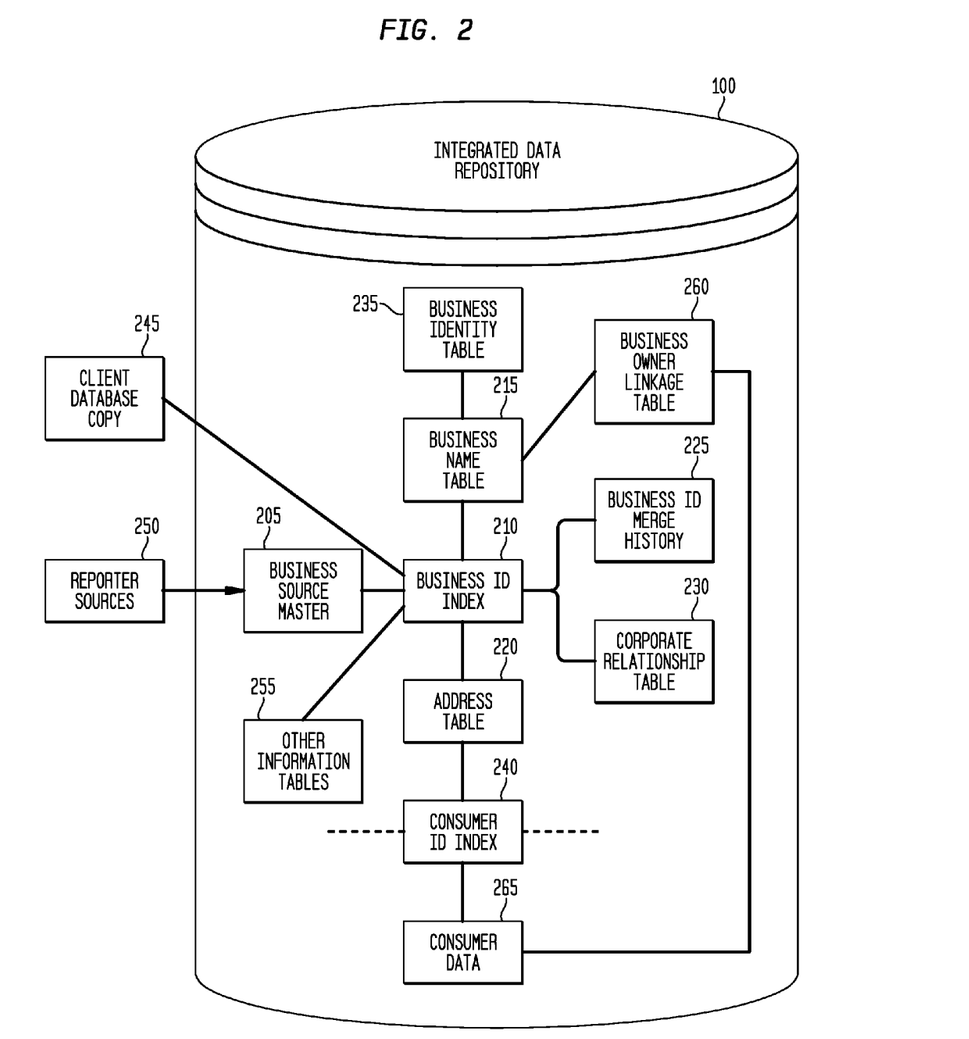
FIG. 2 is a block diagram illustrating an exemplary integrated data repository in accordance with the present invention.

FIG. 2 is a block diagram illustrating an exemplary integrated data repository (or database) 100 in accordance with the present invention. As mentioned above, "data repository" as used herein, is considered interchangeable with "database", and may be relational, object-oriented, or object-relational, or utilize any other database structure, in accordance with a selected embodiment. The database 100 is considered integrated, namely, that the information resides within a singular, co-located or otherwise centralized database structure or schema, rather than distributed between and among a plurality of databases, some of which may be remotely located from the other databases. The database 100 is also considered integrated in that a plurality of different types of tables, objects or relations are included within the database 100, such as including a business source master table 205 with the other illustrated tables discussed below. While generally not included within the database 100 (as private client data), optionally one or more copies of client databases or client master databases (such as client database copy 245) may also be utilized. (Use of non-integrated databases distributed database structures or schemas, however, are within the scope of the present invention. While referred to as tables, it should be understood that the tables illustrated in the database 100 of FIG. 2 are to be construed broadly, to mean and include relations, objects, object relations, multidimensional relations, cubes, or other similar or equivalent database constructs.

An index (relation or look-up table) 210 of identifiers or identifications ("IDs") of a plurality of business entities, referred to herein as business IDs ("BIDs"), is included within the database 100. The BID index 210 also provides relations or cross-references to a plurality of other relations or tables, such as an address table 220, a business source master table 205, a business ID merge history table 225, a corporate relationship table 230, a business name table 215 and, optionally, a business identity table 235, a business owner linkage table 260, a client database copy 245, and other information tables 255. Each of these tables (the address table 220, the business source master table 205, the business ID merge history table 225, the corporate relationship table 230, the business name table 215, the business identity table 235, the business owner linkage table 260, the client database copy 245, and other information tables 255) also provide a reference to a corresponding BID (if any) (e.g., selection of an address from the address table 220 will include a BID associated with that address). In one of the exemplary system embodiments, the address table 220 may also be utilized in common with a consumer ID index or table 240, which further provides relations or cross-references to a plurality of types of consumer data in consumer data table 265, for various consumer-oriented database management services, and for relations to the business owner linkage table 260. The data repository 100 is generally included within a first system 110 and second system 150, and respectively accessed through the I/O 105 and processor 115, or an application server 125 or database management server 140, discussed above.

Use of an address table 220 which is common to both business entity identification and consumer identification has distinct advantages. For example, for any given name or address, it may be initially unknown whether the name or address pertains to a consumer or a business entity, particularly when a proper name is utilized as a business name (e.g., "Marshall Field", "Nordstrom", etc.). For these cases, a search may be performed first through a consumer database, and if no match occurs, through a business database, such as database 100. For example, a search may be performed initially through a consumer name table, and if no match is found, a subsequent search through a business entity name table. Alternatively, a search may be performed through the address table, which may then reference either a BID or a consumer ID, corresponding either to a business entity or an individual person.

A unique business identifier (or identification) (BID), in accordance with the invention, is assigned to a "logical business unit" for a business entity, requiring at least a name and an associated address for the business entity (rather than just a name or just an address), as discussed in greater detail below. In an exemplary embodiment, a BID is 15 bytes, with the first five bytes utilizing alpha characters, and the next ten bytes utilizing integers. The BIDs are initially assigned sequentially and are then encrypted (which eliminates any sequential nature). In addition, in selected embodiments, the entire BID is unique across all applications, and with the ten least significant digits unique across any specific client application (which, for a selected application, requires only the storage of these ten least significant digits). These business identifiers are stored and indexed in the business ID index 210 of the integrated data repository 100.

The address table 220 contains all addresses which will be utilized for searching, comparing, and matching processes, as discussed below. The corporate relationship table 230, for any selected business entity, includes information pertaining to related corporations, such as parent companies, subsidiary companies, sister companies, etc. The business ID merge history table 225 contains all linking information, as discussed in greater detail below, in which one BID is linked to another BID, such that each BID represents the same business entity. The business name table 215 contains all business names, in various forms, variations, abbreviations, and so on, and is also utilized for searching, comparing, and matching processes, as discussed below. The business identity table 235 (optional) includes other types of business information for business entities, such as tax identification ("tax ID") information, standard industry codes ("SIC" codes), telephone numbers, and client or third party identifier or key information, which also may be utilized in the searching, comparing, and matching processes, as discussed below. It should be noted that business entity information may be contained or distributed among one or more tables, such as business name table 215 and business identity table 235, in any number of equivalent ways, any and all of which being within the scope of the present invention. The business owner linkage table 260 (optional) includes information on the owners of business entities who, as individual consumers in many instances, may also have related information in the consumer data table 265. The client database copy 245 (optional) includes a copy of a one or more client databases, typically having some associated level of privacy (private information), but which may also be utilized (with client permission) in searching, comparing, and matching processes, as discussed below, and in determining and providing client database update information. Also optionally included within database 100 are other information tables 255, such as for demographic information, credit information, and fraud information.

The business source master table 205 contains records and other information from a plurality of reporter sources 250. Typically, the reporter sources are selected for reliability, and may include thousands of different sources. For each item of information or other form of record within the database 100, the business source master table 205 will provide information concerning the source of that record, providing a source reference for the current and historical data within the database 100. These relations back to the reporter sources contained in the business source master table 205 are also useful in change detection and updating records within the database 100.

The business identifiers (or identifications) (BIDs), in accordance with the present invention, are persistent and invariant, namely, once assigned to a selected business entity, the BID will continue to exist and identify that selected business entity, at a granular (atomic or data record) level.

The maintenance of records and other information at an "atomic" or "granular" level, without consolidation or merger, and associating those records with a BID, are significant. First, it improves the search methodology of the invention, allowing searches to include data variations, such as name and address variations. For example, "John Skurtovich Enterprises" may match with atomic-level records for "J. Skurtovich", "John Skurtovich Co.", "Skurtovich Enterprises", "Skurtovicke Ent.", and so on, all associated with a BID and maintained at this detailed level. Second, the history and sources for all of this information are also tracked and maintained, providing significant verification capability, and providing additional differentiation capability in the match process (e.g., providing less credibility or weighting to a misspelling, an error, or an infrequent reference). In addition, the atomic level data is maintained in a non-archival or otherwise active way, such that it is always available for making any and all future match, update of linking decisions.

Using the present invention, this BID will continue to exist, and maintain all corresponding historical records, regardless of subsequent changes, updates, and mergers of records. In accordance with the present invention, a first BID assigned to a selected business entity subsequently may be "linked" with (i.e., coupled, associated or otherwise related to) with a second BID assigned to the same (matched) business entity, and so on, through linking or association with an $n^{th}$ BID for the selected, matched business entity. Throughout each of these linkings (couplings, associations or other relations) of or between first and subsequent BIDs, all information associated with each separate BID is maintained over time.

For example, a business entity having a business name "XYZ" and an address of "address 1" may be assigned a (first) BID of "123" in the database 100. Subsequently, a second record is received in the database 100, for a business entity also having a business name "XYZ", but having an address of "address 2". Without more information at the time, it is unknown whether the second "XYZ" is an expansion of the first "XYZ" to a second location "address 2", or is an alternate identification of the first "XYS", or is a separate business entity altogether, such as a second "XYZ" franchise or some other wholly unrelated business which just happens to have the same name. As a consequence, business entity having a business name "XYZ" with an address of "address 2" is assigned a (second) BID of, for example, "456".

Subsequently, more information may become available, such as business account information, telephone number or tax ID, for the business entity having BID "456", e.g., "First National account no. 'qrs'", which matches the business account information of the business entity having BID "123". Utilizing the matching intelligence discussed below, this information may be utilized to indicate that one business entity is involved, having two separate locations, or having multiple addresses within a single business campus. As a consequence, in accordance with the present invention, both first and second BIDs become linked or associated with the other, such that all information pertaining to this selected business entity may be accessed using either BID "123" or "456", and with the preservation of all historical information associated with either BID, such as current and previous addresses, current and previous accounts, other locations, standard industry codes ("SIC" codes), tax identification numbers, telephone numbers, other business information such as related corporations (parent, subsidiary, conglomerate), possible business owner information, the corresponding sources for each item of information, and any authentications or verifications of each item of information. Once linked, all of the information for each BID is effectively "pulled together" as a group, with all data variations included for subsequent searching and matching.

Conversely, subsequent information may be obtained which indicates that these business entities are, in fact, separate, distinct and unrelated business entities. For example, information may be obtained that the second "XYZ" is in a wholly unrelated type of business, such as a car wash business rather than a fast food restaurant. As a consequence, the two separate BIDs will not be linked, but will continue to be maintained separately and independently, also with preservation of all historical information separately associated with each BID.

The matching intelligence avoids linking records which have incompatible data, even when some element matches exist. Using an individual name, for example, the method of the invention would not link a "Mary Smith" with a "John Smith", as the gender data is incompatible. Similarly for business records, certain records which are not compatible would not be linked, such as a business record having a restaurant SIC code and a business record having a manufacturing SIC code, even if the respective names match.

This linking of separate (and previously independent) BIDs, coupled with the persistence of each separate BID, in accordance with the present invention, provides a mechanism to maintain all corresponding historical data and records, with corresponding source information, without merger of records, in stark contrast with the prior art. This also enables the associated records to be maintained as a group, and incorporated into searching and matching algorithms, with a selected record able to be matched against atomic or granular-level records contained within an entire group rather than to merged records. As discussed in greater detail below, the methodology of the present invention focuses on providing data associations, rather than reducing the number of entities, and will default to maintaining separate records with unlinked BIDs, unless evidence exists to link the records. In addition, the linkage technology of the present invention helps to enable a self-healing database, with potentially erroneous or unauthenticated information given less confidence or lower ranking in searching and matching, based on collected confirmations from various ranked sources.

In the prior art, however, such matching records would be merged or updated, potentially with a default to merger, with the potential loss of any previously associated identifier or key, and with a loss of corresponding historical information for that identifier (purge), including a loss of the identification of information sources for a particular record. In other prior art circumstances, the information would not be merged, but also would not be associated, with all updates going to the second identifier, and with the first identifier effectively becoming dormant. In other circumstances, historical records may be archived and rendered unavailable for use in future match, update of linking decisions.

The linkage methodology of the present invention, with its associated search and match methodology, is discussed in greater detail with reference to FIG. 3. The present invention utilizes a "logical business unit" for a business entity, requiring at least a name and an associated address for the business entity (rather than just a name or just an address). This allows, for example, multiple franchises having the same name to nonetheless be differentiated as separate businesses. Other information, such as account or business credit information, a single mailing address, a single billing address, etc., may be utilized to associate a single business with multiple addresses as one "logical business unit" with an associated BID.

Because of the importance of address information in business identification, the present invention also utilizes a second identifier, referred to as a site identifier ("site ID"), which is also persistent. For example, a business having multiple locations may have a selected business ID (and possibly previous BIDs which have now been linked to the selected BID), coupled with one or more site IDs, for each business address. The combined BID and site ID then provides a unique identifier for each location for that business entity.

The linkage methodology of the present invention may occur under a wide variety of circumstances. One such circumstance, illustrated in FIG. 3, may occur in comparing or evaluating customer or client data, such as for providing mailing list or other client data corrections, eliminating duplicate client records, providing enhanced data, or for providing information for a particular client inquiry. Another circumstance, also illustrated in FIG. 3, may occur in updating the database 100 with current information from reporter sources, generally on a regular basis, when incoming data from reporter sources or other current information is compared with existing data, and may or may not match.

Figure 3:
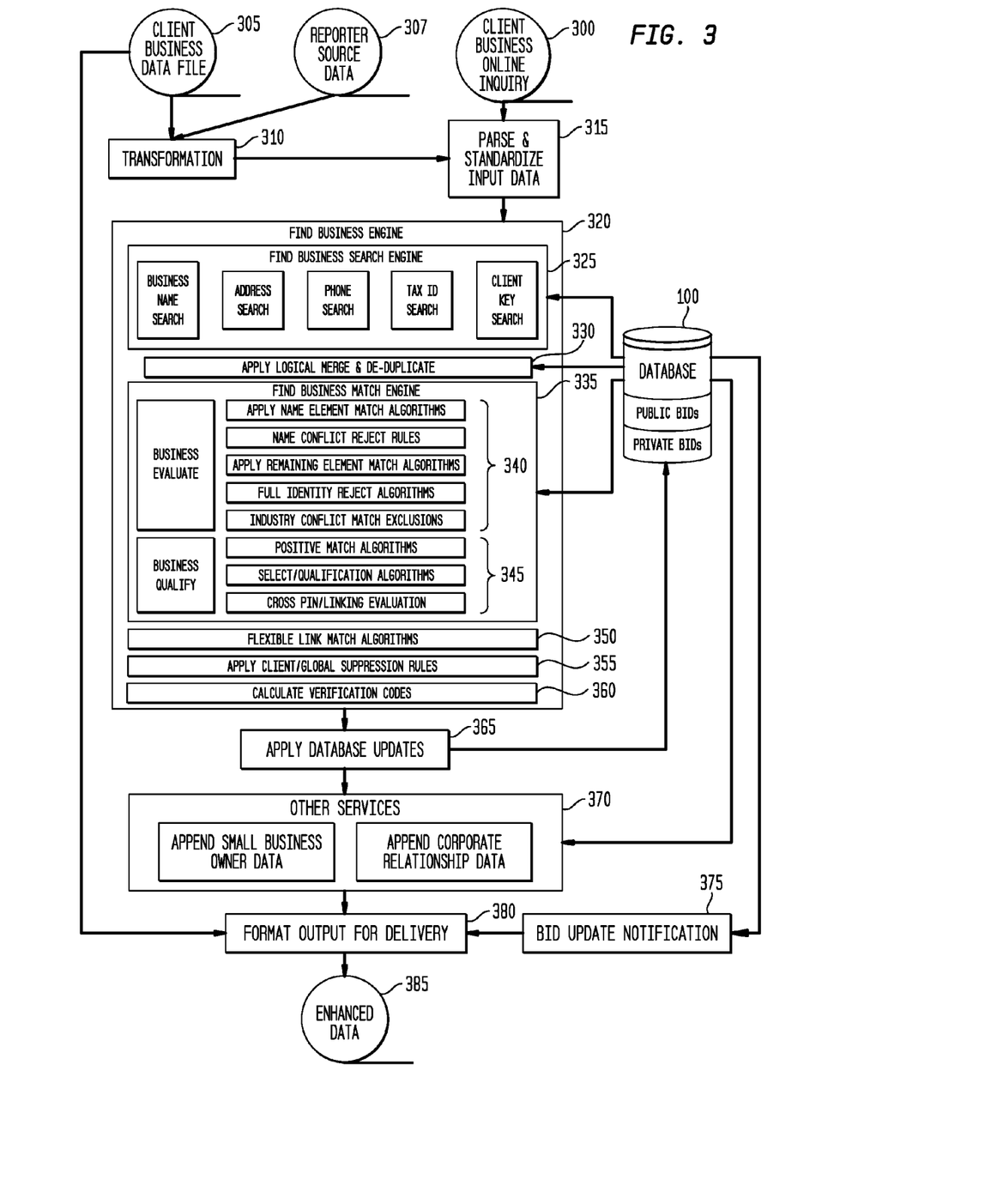
FIG. 3 is a flow diagram illustrating a first exemplary business linking method in accordance with the present invention.

FIG. 3 is a flow diagram illustrating a first exemplary business linkage method in accordance with the present invention. Referring to FIG. 3, the method begins with a business inquiry from a client, step 300, such as an online inquiry, or through submission of a list or file (referred to as a batch file), such as a mailing list of names and addresses, step 305, or through input of reporter source data, step 307. When such a batch file is submitted in step 305, or depending upon the type of reporter information input in step 307, the batch file or reporter information is converted to a standard input format (transformation), step 310, using any applicable or available software, such as Group One. In addition, in the transformation step 310, reporter information also may be edited and ranked, prior to conversion to the standard input format. From step 300, 307 or 310, the input information, generally referred to herein as "inquiry data" (or, in some cases, reporter data), is parsed and standardized, step 315, so that all matches and comparisons will utilize the same types of data having the same type of format or structure. Step 315 may also include various types of corrections, for example, zip or other postal code corrections.

Next, the inquiry data is searched and matched using a methodology referred to as the "Find Business Engine", step 320, with its plurality of incorporated steps, discussed below. The search and match methodology begins by searching within database 100 for any and all possible or potential matches, using a plurality of potential match criteria or keys, step 325, with a goal of maximizing the number of possible matches and incorporating any potential match into the search results. As a consequence, the search step 325 includes, as a potential match, any record which matches to any of the plurality of match criteria or keys, including business name, address, telephone number, tax identification numbers, and any client key information (which may include private, subscription, or third party information or identifiers). When the client inquiry information also includes a BID reference, BID matching (as key matching) is also utilized in step 325. Exact matches are not required, and matching rules in this search step 325 are overly inclusive, allowing misspellings, missing characters or numbers, character or number shuffles, nicknames or shortened names and addresses, "sounds like" names and addresses, and so on. The quality of the match is considered, however, providing higher qualifications to an exact match compared to a less exact match. The search process may utilize any of the various tables of the database 100 discussed above.

From the results of the search, which is generally overly inclusive, in step 330, duplicate records are eliminated, such as those with the same BID. Also within step 330, the results are also examined to determine which are subject to a "logical merge", i.e., which records already have linked BIDs, by examining the Business ID merge history table 225 within database 100. Utilizing logical merger results, such as linked BIDs, provides more consistent results to different inquiries.

The system, method and software of the invention then begin to determine whether the inquiry data matches to an existing record of the database 100, step 335. The matching process is divided into two portions. In a first "Business Evaluate" portion, potential matches from the group of possible matches are rejected, and variations in the match for each element are determined and weighted or ranked, step 340. In a second "Business Qualify" portion, the inquiry data must affirmatively qualify to be a match, step 345. The result of the matching process may be a match to an existing record, with or without BID linking, or no match to an existing record, with an assignment of a new BID or a "suspense ID" (discussed in greater detail below). The matching process is considered "rules-based", as an expert system, rather than merely using a model-based matching system with a scoring or weighting methodology.

The "Business Evaluate" portion of the matching process (step 340), eliminates potential matches using a variety of criteria, using rejection logic or algorithms, as illustrated in FIG. 3. Initial elimination is based on a business name element, from business name table 215 within database 100. Clear conflicts in names are eliminated from the group of possible matches, without requiring the use of additional data, providing greater matching efficiency. For example, in matching to an inquiry with a business name of "Experian", other businesses having similar addresses are eliminated, such as "Kinko's copy center". Other types of name rejections are also utilized, and may include use of other information, such as a conflict in both names and tax identifications. Other "negative" or elimination match algorithms are also utilized, eliminating conflicts in names, addresses, and so on. "Full identity" rejection logic is then applied, such that a record is rejected as a match when the record partially matches in one field, but conflicts in two other fields, utilizing any available data from the database 100. Conflicts of standard industry codes are also utilized to eliminate potential matches from the group of potential matches, such as eliminating cleaning and manufacturing businesses when searching and matching for a restaurant business. Rankings or weightings for match variations (e.g., strong weighting for an exact match of an element, less weighting for a "sounds-like" or other inexact match). These conflict and elimination determinations may be made utilizing any of the various tables of the database 100 discussed above.

Having winnowed or otherwise reduced the group of potential matches in step 340, the second portion of the matching process (step 345) then examines conditions which should exist or occur in order for the inquiry data to affirmatively qualify as a match to an existing record, using "positive match" algorithms. In general, at least two elements or fields are required to match, as pairs of information, with degrees of matching (exact, less exact or "fuzzy"), with corresponding weighting. For example, a match of both name and address will qualify as a match for the inquiry data, and may override a conflict of other data, such as SIC code, tax ID, or telephone number.

The results of the positive matching are then examined; the results may be that no match has been found, a match has been found, more than one match has been found, or that more information is required in the inquiry to determine a match. If no match is found, the inquiry data may be assigned a new BID, and stored for subsequent match and linking determinations. If more than one match is found, the results may be examined to determine whether BID linking is in order, and whether a tie-breaker ("cross PIN") analysis should be performed. In addition, such data may be logged or stored as public or private.

As mentioned above, BID linking may occur when sufficient information exists to link previously separate and independent records having distinct BIDs. For example, the inquiry (or update data) may contain business name and account information, which matches to a first BID, and name and address information which matches equally well to a second BID. The first and second BIDs may be linked and logically merged in accordance with the present invention, indicating a new business location, in this example. As a result of the linking, one of the linked BIDs will be provided as a match result.

In addition, the results are examined to perform a tie-break for two equally matched BIDs. As historical data is maintained at a granular level for each BID and any of its linked BIDs, such as variations of name, address, tax ID and telephone number information, with associated weightings and verifications, this information may be examined in greater detail, to determine whether one BID provides a closer match than another BID.

Other than with reporter data, match criteria may also be more flexible, depending upon the selected embodiment, to provide a less accurate match capability, such as a "best guess" with less confidence than an exact match. For such a selected embodiment, in step 350, the matching results may be re-examined or re-evaluated with less strict matching requirements, such as examining similarities. (For reporter data, in the selected embodiments, an exact match is preferred, to avoid a potential series of inaccurate matches). The result may also be a matched BID, or that more inquiry information is required to perform a match (e.g., a name "Water Tower" for a shopping mall may include many businesses having "Water Tower" in their names, such as "Water Tower" cleaners, "Water Tower" supermarket, "Water Tower" restaurant, and so on, requiring more information to identify a particular business). Another option, for a plurality of equally but flexibly matched entities, is to consistently select a particular BID for the match, such as the lowest BID.

Considerable intelligence is provided as a result of this search and match process. Providing that no match is found, or that more information is needed to differentiate potential matches, can be very significant. For example, it may prevent a company from unknowingly extending credit to a problematic business that has a similar name to another company, or prevent a company from extending a repeat customer promotional offer to a non-customer.

Following steps 345 or 350, results from the search and match process may be that no match has been found, a match has been found and a BID provided, or that more information is required in the inquiry to determine a match. When a BID has been matched, client-based or global suppression rules are then applied, step 355, to determine whether the matched BID and corresponding information may be provided as output. For example, credit information may be subject to global suppression rules, such that particular information is not provided unless confirmed from more than one source. Other information may be private for a particular client, such that the information will be provided as output only to that client, and suppressed for all others. Other private information may be allowed to be provided to selected industries and not others.

For the information which is provided following step 355, verification, site IDs and other authentication codes are provided, step 360. Authentication codes are used to indicate that particular information was reported and is being updated by one or more reliable reporter sources. Site IDs, as indicated above, are unique identifiers provided for every address associated with a selected BID. Verification codes are provided to indicate the quality of associated information, such as a match to a telephone number which is not current, or a match in which a tax ID of the inquiry data is a few digits off. Verification codes may also indicate that particular data has not been verified and is merely being logged and tracked, for example. The various flexible linking or other inexact matching information may also be provided, with corresponding confidence levels or other indication of the degree or closeness of match.

The resulting data from the search and match process may then be applied to update the database 100, step 365. For example, when no match has occurred, the inquiry data may be logged and stored in the database with its own new and unique BID. For private client data which is not in reported sources, when no match has occurred, the inquiry data may be logged and stored using a "suspense ID" or other form of private identification, allowing the information to be tracked as private information, which may be subsequently confirmed and matched to a selected BID, and provided as an update notification to the client.

Other services may also be provided within the methodology of FIG. 3, step 370, such as appending business owner data (particularly for small businesses), or appending corporate relationship data, such as parent, subsidiary and other related corporate information. Additional information concerning business owners may also be available from the corresponding consumer data table 265 and other consumer information sources. Depending upon the selected embodiment, other integrated services may also be provided, such as appending demographic or credit data.

As indicated above, based on incoming information (such as from reporter services), a suspense ID may become associated with a BID, or a first BID may become linked with a second BID, third BID, etc. As a consequence, this subsequent information is provided as part of the output results, step 375, in selected embodiments of the invention.

Following steps 370 and 375, the resulting information, such as matching BIDs and associated name, address, tax ID, telephone numbers, BID updates, suspense ID updates, and other requested information, is formatted for delivery to the client, step 380. Such formatting may be in the form of a useable list for the client, as enhanced data corresponding to the client batch file, or as enhanced data formatted for network communication, such as using hypertext or extensible markup language for display as a web page. In addition, in step 380, encrypting may be utilized, and may be customized for a selected client. When private data is included, the particular client will have a unique view of the resulting data which may be unavailable to others. Once formatted, the enhanced data provided by the search and match process with linkable and persistent Business IDs is provided, step 385, and the method may end.

The output data may be utilized for a wide variety of purposes. The persistent BID may be utilized for tracking and updating associated information. The output data may be used for confirmation of the existence of a business, that a "real" company is involved, and is significant for fraud prevention. The output data also provides an indication of the quality of associated data, and may be enhanced with a wide variety of related information.

A variation of the methodology illustrated in FIG. 3 may be utilized for updating the database 100 using reporter data from reporter sources (from step 307). Such reporter data may or may not require the extensive search and match technology utilized for inquiry data. Under certain circumstances, utilizing the business source master table 205, name and address fields may be hashed, with numeric values assigned to character strings, and compared with a corresponding hash value from the reporter data. For change detection, if the hash values are identical, then the reporter data indicates that no change has occurred, while if the hash values are different, a change (update) is indicated for that record.

An additional feature typically utilized in updating the database 100 from reporter sources, and mentioned briefly above, is use of a "triangulation" point for change detection and updating. Various sets of overlapping or partially overlapping information may be utilized, with agreement of two or more fields indicating a change in another (third) field. For example, a particular record may have business name, address, and account information. Current information from a reporter source may match on the name and account information, and have a different address. This reporter source, with agreement in two areas, may be utilized to update a third area, such as the address information. When this updated information is associated with a second BID, this triangulation provides an important way to determine linkage of two or more separate and previously independent BIDs to each other.

As indicated above, the system of the present invention generally comprises a memory storing a data repository (or database) 100 and a processor, such as a processor 115 included within a mainframe computer of system 110 or within either (or both) a database management server 140 or an application server 125 of system 150. The processor is programmed to perform the linking methodology of the present invention, generally as part of more general search and match capability, for inquiry data or for reporter data. As a consequence, the system and method of the present invention may be embodied as software which provides such programming.

More generally, the system, methods and programs of the present invention may be embodied in any number of forms, such as within any type of computer, within a workstation, within an application server such as application server 125, within a database management server 140, within a computer network, within an adaptive computing device, or within any other form of computing or other system used to create or contain source code. Such source code further may be compiled into some form of instructions or object code (including assembly language instructions or configuration information). The software or source code of the present invention may be embodied as any type of source code, such as SQL and its variations (e.g., SQL 99 or proprietary versions of SQL), C, C++, Java, or any other type of programming language which performs the functionality discussed above. As a consequence, a "construct" or "program construct", as used herein, means and refers to any programming language, of any kind, with any syntax or signatures, which provides or can be interpreted to provide the associated functionality or methodology (when instantiated or loaded into a server or other computing device).

The software or other source code of the present invention and any resulting bit file (object code or configuration bit sequence) may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2$PROM, or any other type of memory, storage medium, or data storage apparatus or circuit, depending upon the selected embodiment. For example, without limitation, a tangible medium storing computer readable software, or other machine-readable medium, may include a floppy disk, a CDROM, a CD-RW, a magnetic hard drive, an optical drive, a quantum computing storage medium or device, or any other type of data storage apparatus or medium.

In summary, the present invention provides a method, system and software for associating a plurality of business records to a business entity of a plurality of business entities. An exemplary system embodiment (110,150) comprises a memory storing or housing a data repository (100) and a processor coupled to the data repository, such as a processor within a mainframe computer (110), an application server (125) or a database management server (140). The data repository (memory) stores the plurality of business records and stores a plurality of business identifiers, wherein each business identifier of the plurality of business identifiers is unique. The processor is configured to associate a first business record, of the plurality of business records, with a first business identifier of the plurality of business identifiers; and to associate a second business record, of the plurality of business records, with a second business identifier of the plurality of business identifiers. This second association, of a second BID, is generally a consequence of the second business record not matching the first business record sufficiently. Subsequently, when the first business identifier and the second business identifier are determined to correspond to a singular business entity of the plurality of business entities, the processor is further configured to link the first business identifier and the second business identifier and to maintain the link of the first business identifier and the second business identifier in the data repository.

The processor is further configured to maintain in the data repository (memory) the respective associations of the first business record and the second business record with the linked first business identifier and second business identifier, generally for a predetermined period of time, such as 10 or more years, or such as another minimum period of time followed by an indefinite period, such as a current plan to maintain the data forever.

The processor is further configured to determine that the first business identifier and the second business identifier correspond to the singular business entity by determining that a third business record, of the plurality of business records, is both associated with the first business record and associated with the second business record, such as by determining that a third business record, of the plurality of business records, matches with a first element of a first plurality of elements of the first business record and further matches with a second element of a second plurality of elements of the second business record. In accordance with the invention, the first plurality of elements and the second plurality of elements each comprise at least two of the following elements: a business name element, a business address element, a tax identification element, a telephone number element, a standard industry code element, and a client key element.

Also in summary, the processor is further configured to determine a match by: determining a plurality of potentially matching business records; and eliminating, from the plurality of potentially matching business records, a potentially matching business record which does not match a business name element of the third business record, or a potentially matching business record which does not match a business address element of the third business record, or a potentially matching business record which does not match a standard industry code element of the third business record. Following elimination of one or more potentially matching business records from the plurality of potentially matching business records, the processor is further configured to affirmatively match the third business record to the first element of the first plurality of elements of the first business record, the first business record remaining within the plurality of potentially matching business records, and to affirmatively match the third business record to the second element of the second plurality of elements of the second business record, the second business record remaining within the plurality of potentially matching business records. The affirmative matching may be exact, or may be flexible and have a corresponding confidence level.

Prior to linking, the processor is further configured to associate the first business record with the first business identifier by matching the first business record to another business record associated with the first business identifier, of the plurality of business records, or to associate the first business record with the first business identifier by not matching the first business record to any another business record of the plurality of business records and to assign the first business identifier to the first business record as representative of a previously unidentified business entity of the plurality of business entities.

Lastly, the processor is further configured to associate a plurality of business addresses with the first business identifier, each business address of the plurality of business addresses having a unique site identifier of a plurality of site identifiers associated with the first business identifier, and to maintain in the data repository the association of the plurality of business addresses and corresponding plurality of site identifiers with the first business identifier.

Numerous advantages of the present invention are readily apparent. The present invention provides a system, method and software for linking unique business identifiers, associated with business entities, for associating corresponding business records without a loss of historical records, regardless of subsequent changes, updates, and mergers. The business identifiers of the present invention are persistent and invariant. Following a linking of business identifiers, each business identifier of the linking continues to exist, will all corresponding historical and other associated records.

The maintenance of records and other information at a "granular" level, without consolidation or merger, and associating those records with a BID, provides for improved searching and matching capability, allowing searches to include data variations which might otherwise be lost in a merger of data records. The history and sources for all of this information are also tracked and maintained, providing significant verification capability, differentiation capability and corresponding confidence levels in the match process.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A computer-implemented method of creating a data structure stored in one or more data storage devices, wherein the data structure provides information to link records that are related to a same entity of a plurality of entities, for database searching and record matching operations, the method comprising:
    (a) associating a first record, of a plurality of records, with a first identifier of a plurality of identifiers that identifies at least one entity of the plurality of entities, wherein each identifier is unique and persistent for a predetermined period of time;
    (b) associating a second record, of the plurality of records, with a second identifier that identifies at least one entity of the plurality of entities;
    (c) determining a plurality of potentially matching records, and from the plurality of potentially matching records, differentially weighting one or more records having at least one match variation;
    (d) from the plurality of potentially matching records, and using the differential weighting, eliminating a potentially matching record which does not match a selected or predetermined element of the first or second records within a selected or predetermined confidence level;
    (e) determining that the first identifier and the second identifier correspond to a same entity by determining that a third record, of the plurality of potentially matching records, matches with a first element of a first plurality of elements of the first record within the selected or predetermined confidence level and further matches with a second element of a second plurality of elements of the second record within the selected or predetermined confidence level;
    (f) linking the first identifier and the second identifier in a data structure that respectively references the first and second records without merging the first and second records under either the first or second identifiers and without merging the first and second identifiers; and
    (g) using the link between the first and second identifiers in the data structure, grouping and providing retrieved information that is separately maintained in both the first and second records in response to a request for information about the same entity.

2. The computer-implemented method of claim 1, further comprising:
    (h) separately maintaining in at least one database information in the first record associated with the first identifier and information in the second record associated with the second identifier for the predetermined period of time; and
    (i) collectively utilizing records associated with the linked first identifier and second identifier in subsequent search and match determinations.

3. The computer-implemented method of claim 1, further comprising:
    (j) using a triangulation point for change detection and updating information associated with the first or second identifiers in at least one database.

4. The computer-implemented method of claim 1, wherein the first plurality of elements and the second plurality of elements each comprise at least one element selected from the group consisting of: a name element, an address element, a tax identification element, a telephone number element, a standard industry code element, a client key element, and combinations thereof.

5. The computer-implemented method of claim 1, further comprising:
    determining the plurality of potentially matching records from the plurality of records, and from the plurality of potentially matching records, eliminating a potentially matching record which does not match a name element or a tax identification element of the third record.

6. The computer-implemented method of claim 5, further comprising:
    from the plurality of potentially matching records, eliminating a potentially matching record which does not match an address element of the third record.

7. The computer-implemented method of claim 5, further comprising:
    following elimination of one or more potentially matching records from the plurality of potentially matching records, affirmatively matching the third record to the first element of the first plurality of elements of the first record, the first record remaining within the plurality of potentially matching records, and affirmatively matching the third record to the second element of the second plurality of elements of the second record, the second record remaining within the plurality of potentially matching records.

8. The computer-implemented method of claim 7, wherein a degree of affirmative matching is variable and has a corresponding confidence level.

9. The computer-implemented method of claim 1, wherein the plurality of entities is selected from the group consisting of: a plurality of persons, a plurality of organizations, a plurality of corporations, a plurality of companies, a plurality of partnerships, a plurality of governmental organizations, and combinations thereof.

10. The computer-implemented method of claim 1, wherein step (a) further comprises:
    associating the first record with the first identifier by matching the first record to another record associated with the first identifier, of the plurality of records.

11. The computer-implemented method of claim 1, wherein step (a) further comprises:
    associating the first record with the first identifier by not matching to any other record of the plurality of records and assigning the first identifier to the first record as representative of a previously unidentified entity of the plurality of entities.

12. The computer-implemented method of claim 1, further comprising:
    associating a plurality of addresses with the first identifier, each address of the plurality of addresses having a unique site identifier of a plurality of site identifiers associated with the first identifier.

13. The computer-implemented method of claim 1, further comprising:
prior to step (a), searching a consumer database for a match of the first record and, when no match is determined, searching a business database for a match of the first record.

14. A system for creating a data structure to link records that are related to a same entity of a plurality of entities, for data repository searching and for record matching operations, the system comprising:
one or more data storage devices to store one or more data repositories having a plurality of records and a plurality of identifiers, each identifier of the plurality of identifiers identifying an entity of the plurality of entities, wherein each identifier is unique and persistent for a predetermined period of time; and
one or more processors coupled to the one or more data storage devices, the one or more processors adapted, configured or programmed to associate a first record of the plurality of records with a first identifier that identifies at least one entity of the plurality of entities; to associate a second record of the plurality of records with a second identifier that identifies at least one entity of the plurality of entities; to determine a plurality of potentially matching records, and from the plurality of potentially matching records, to differentially weight one or more records having at least one match variation, and using the differential weighting, to eliminate a potentially matching record which does not match a selected or predetermined element of the first or second records within a selected or predetermined confidence level; to determine that the first identifier and the second identifier correspond to the same entity by determining that a third record, of the plurality of potentially matching records, matches with a first element of a first plurality of elements of the first record within the selected or predetermined confidence level and further matches with a second element of a second plurality of elements of the second record within the selected or predetermined confidence level; to link in the one or more data repositories the first identifier and the second identifier in a data structure that respectively references the first and second records without merging the first and second records under either the first or second identifiers and without merging the first and second identifiers; and using the link between the first and second identifiers in the data structure, to retrieve and group information that is separately maintained in both the first and second records in response to a request for information about the same entity.

15. The system of claim 14, wherein the one or more processors are to separately maintain in the data repository information in the first record associated with the first identifier and information in the second record associated with the second identifier for the predetermined period of time.

16. The system of claim 14, wherein the one or more processors are to collectively utilize the records associated with the linked first identifier and second identifier in subsequent search and match determinations.

17. The system of claim 14, wherein the first plurality of elements and the second plurality of elements each comprise at least one element selected from the group consisting of: a name element, an address element, a tax identification element, a telephone number element, a standard industry code element, a client key element, and combinations thereof.

18. The system of claim 14, wherein the one or more processors are to determine a plurality of potentially matching records, and from the plurality of potentially matching records, to eliminate a potentially matching record which does not match a name element or a tax identification element of the third record.

19. The system of claim 18, wherein the one or more processors are to eliminate, from the plurality of potentially matching records, a potentially matching record which does not match an address element of the third record.

20. The system of claim 19, wherein following elimination of one or more potentially matching records from the plurality of potentially matching records, the one or more processors are to affirmatively match the third record to the first element of the first plurality of elements of the first record, the first record remaining within the plurality of potentially matching records, and to affirmatively match the third record to the second element of the second plurality of elements of the second record, the second record remaining within the plurality of potentially matching records.

21. The system of claim 20, wherein a degree of affirmative matching is variable and has a corresponding confidence level.

22. The system of claim 14, wherein the plurality of entities is selected from the group consisting of: a plurality of persons, a plurality of organizations, a plurality of corporations, a plurality of companies, a plurality of partnerships, a plurality of governmental organizations, and combinations thereof.

23. The system of claim 14, wherein the one or more processors are to associate the first record with the first identifier by matching the first record to another record associated with the first identifier, of the plurality of records.

24. The system of claim 14, the one or more processors are to associate the first record with the first identifier by not matching the first record to any other record of the first plurality of records and to assign the first identifier to the first record as representative of a previously unidentified entity of the plurality of entities.

25. The system of claim 14, wherein the one or more processors are to associate a plurality of addresses with the first identifier, each address of the plurality of addresses having a unique site identifier of a plurality of site identifiers associated with the first identifier, and to maintain in the data repository the association of the plurality of addresses and corresponding plurality of site identifiers with the first identifier.

26. The system of claim 14, wherein the one or more processors are to search a consumer database for a match of the first record and, when no match is determined, to search a business database for a match of the first record.

27. A tangible computer-readable medium storing computer-readable software for creating a data structure in one or more data repositories stored in one or more data storage devices, wherein the data structure provides information to link records that are related to a same entity of a plurality of entities, for database searching and record matching operations, the tangible computer-readable medium storing computer-readable software comprising:
executable code for associating a first record, of a plurality of records of the one or more data repositories stored in the one or more data storage devices, with a first identifier of a plurality of identifiers that identifies at least one entity of the plurality of entities, wherein each identifier is unique and persistent for a predetermined period of time;

executable code for associating a second record, of the plurality of records, with a second identifier that identifies at least one entity of the plurality of entities;

executable code for determining a plurality of potentially matching records, and from the plurality of potentially matching records, differentially weighting one or more records having at least one match variation;

executable code for determining a plurality of potentially matching records, and from the plurality of potentially matching records and using the differential weighting, eliminating a potentially matching record which does not sufficiently match a selected or predetermined element of the first or second records within a selected or predetermined confidence level;

executable code for determining that the first identifier and the second identifier correspond to the same entity by determining that a third record, of the plurality of potentially matching records, matches with a first element of a first plurality of elements of the first record within the selected or predetermined confidence level and further matches with a second element of a second plurality of elements of the second record within a selected or predetermined confidence level;

executable code for linking the first identifier and the second identifier in at least one data structure that respectively references the first and second records without merging the first and second records under either the first or second identifiers and without merging the first and second identifiers; and executable code for using the link between the first and second identifiers in the data structure and grouping and providing retrieved information that is separately maintained in both the first and second records in response to a request for information about the same entity.

* * * * *